(12) United States Patent
Chen et al.

(10) Patent No.: US 7,960,936 B2
(45) Date of Patent: Jun. 14, 2011

(54) METHODS AND APPARATUS TO LOCK A PHASE LOCK LOOP TO A MOTOR

(75) Inventors: Liyong Chen, Plano, TX (US); Irfan A. Chaudhry, Plano, TX (US); Steven Chacko, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 483 days.

(21) Appl. No.: 11/697,520

(22) Filed: Apr. 6, 2007

(65) Prior Publication Data

US 2008/0112696 A1 May 15, 2008

Related U.S. Application Data

(60) Provisional application No. 60/865,778, filed on Nov. 14, 2006.

(51) Int. Cl.
*G05B 11/36* (2006.01)

(52) U.S. Cl. ........................................ 318/609; 318/610

(58) Field of Classification Search .................. 318/609, 318/610, 432, 727, 459, 500
See application file for complete search history.

(56) References Cited

U.S. PATENT DOCUMENTS

| 5,631,999 | A | | 5/1997 | Dinsmore | |
|---|---|---|---|---|---|
| 6,160,368 | A | * | 12/2000 | Plutowski | 318/375 |
| 6,215,261 | B1 | * | 4/2001 | Becerra | 318/400.26 |
| 6,285,521 | B1 | * | 9/2001 | Hussein | 360/73.03 |
| 6,900,604 | B2 | | 5/2005 | Kokami et al. | |
| 7,034,478 | B2 | | 4/2006 | Bhaumik et al. | |

\* cited by examiner

*Primary Examiner* — Rina I Duda
(74) *Attorney, Agent, or Firm* — Dawn V. Stephens; Wade James Brady, III; Frederick J. Telecky, Jr.

(57) ABSTRACT

Methods and apparatus to lock a phase lock loop to a spindle motor are disclosed. An example controller comprises a counter to determine a period of an operating signal received from a motor, an oscillator to generate a control signal based on an input signal, and an initializer to generate the input value based on the period, wherein the input value causes the oscillator to generate the control signal having the same phase as the operating signal.

14 Claims, 4 Drawing Sheets

US 7,960,936 B2

METHODS AND APPARATUS TO LOCK A PHASE LOCK LOOP TO A MOTOR

RELATED APPLICATIONS

This application claims priority from U.S. provisional application Ser. No. 60/865,778 filed Nov. 14, 2006, which is hereby incorporated by reference in its entirety.

FIELD OF THE DISCLOSURE

This disclosure relates generally to motor control and, more particularly, to methods and apparatus to lock a phase lock loop to a motor.

BACKGROUND

Multiple phase motors are powered by a driver that provides current and voltage to each of the phases of the motor in proper sequence. For example, a three-phase motor consists of sets of motor leads that are driven 120 degrees out of phase with one another to cause motor rotation. The driver of the motor, such as a field effect transistor (FET), may be controlled by a state machine with many states. For example, a state machine for a three-phase motor in a hard drive has six states. Each state controls the current flowing from one phase of the motor to another. To efficiently drive the motor and to minimize the mechanical vibration, the state machine must progress through the states in a certain sequence and change the states at a certain rate. The rate of change of the states is controlled by a clock.

In one example, a phase locked loop (PLL) is used to generate the clock that matches the rotation rate of the motor. To this end, the back electromotive force (BEMF) signal from motor is compared with the generated clock from the phase lock loop. The error generated from this comparison of the frequency and phase of the clock signal to the frequency and phase of the BEMF signal is used to adjust the phase lock loop to cause the clock signal to match the motor BEMF signal. This closed-loop control system continually adjusts the phase lock loop such that the generated clock signal can be accurately locked to the frequency and phase of the BEMF of the motor.

DETAILED DESCRIPTION

Figure 1:
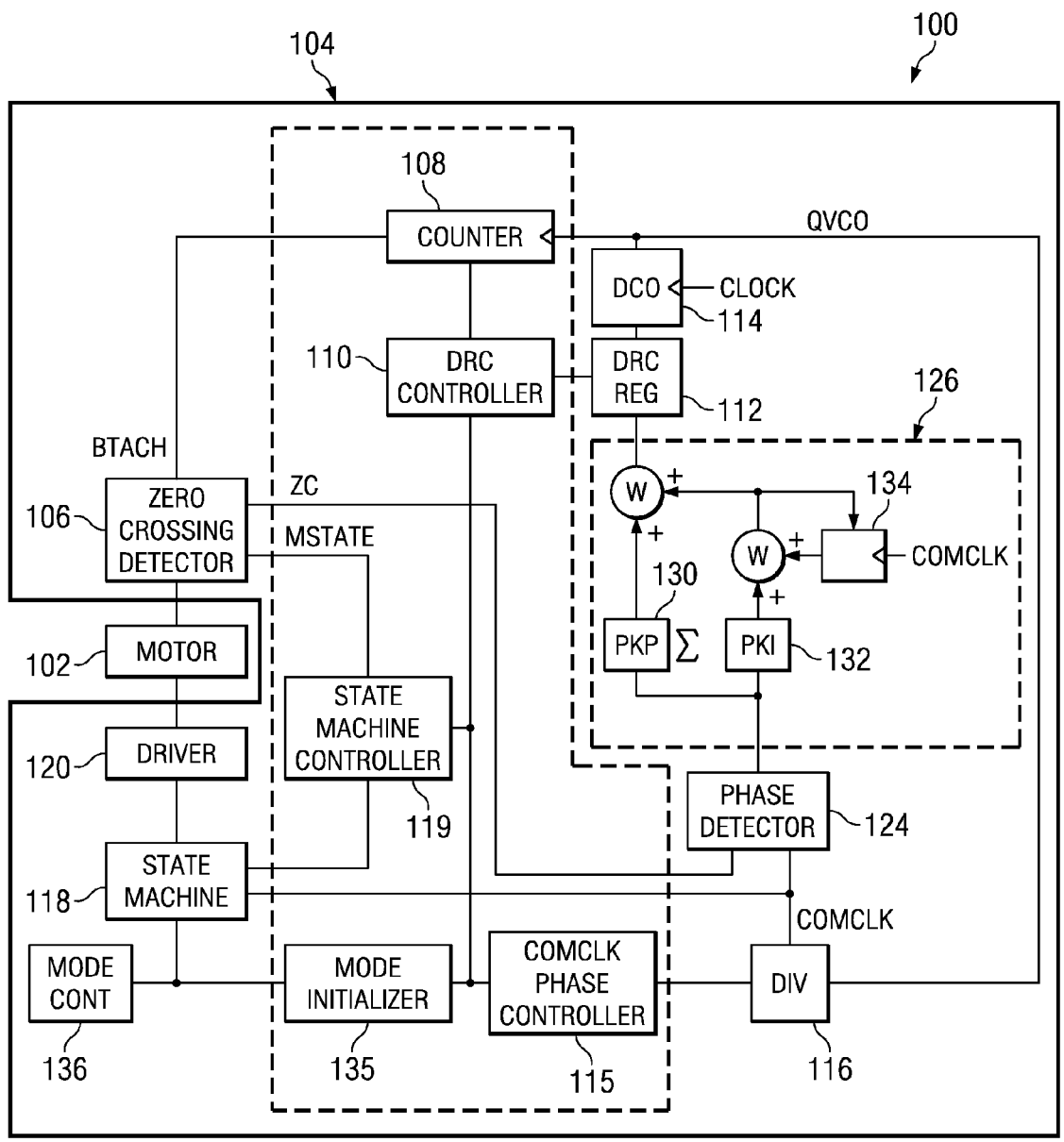
FIG. 1 is a block diagram of an example system for controlling a motor.

FIG. 1 is a block diagram of an example system 100 for controlling a motor 102. The example system 100 includes a controller 104. In one example implementation, the motor 102 is a spindle motor that drives the rotation of the data storage platters of a hard disk drive. As described herein, the controller 104 is capable of quickly starting-up the motor 102 by locking a controlling clock signal to the frequency and phase of the motor 102 and driving the motor 102 using the controlling clock signal. In one example implementation disclosed herein, the controller 104 determines a startup condition for the control signal by determining a period of a signal based on the back electromotive force (BEMF) of the motor 102, calculating a startup condition based on the period of the BEMF, and storing the startup condition in a register. The example controller minimizes the time needed to lock the controlling clock to the frequency and phase of BTACH generated from the motor BEMF.

The motor 102 of the illustrated example is a three-phase spindle motor. However, any multiple phase motor may be used. The motor 102 receives control signals from the controller 104 that drive the individual phases of the motor 102. For example, in the example implementation of the motor 102 with three phases, the motor 102 receives three control signals from the controller 104. The control signals for the motor 102 are described in further detail in conjunction with FIG. 2.

The motor 102 of the illustrated example generates BEMF that may be analyzed by connecting a probe to each of the phases of the motor 102 and the center tap of the motor 102 while the motor is coasting (i.e., the rotor of the motor 102 is spinning, but the motor is not being powered). The controller 104 analyzes the BEMF signals to ensure that the control signals from the controller 104 match the phase and frequency of the operating characteristics of the motor 102. The analysis of the BEMF signals is described in further detail in conjunction with the description of the controller 104 and FIG. 2.

As described above, the controller 104 analyzes the BEMF signals from the motor 102 and outputs control signals to the motor 102. In one example, the controller 104 of the illustrated example is implemented as a phase lock loop (PLL) on a general purpose digital signal processor (DSP) integrated circuit (IC). For example, the controller 104 may be implemented by hard-coded or soft-coded instructions (e.g., Verilog instructions) that are executed by the DSP. Alternatively, a portion (e.g., one or more of the blocks described below) of the controller 104 or the entire controller 104 may be implemented in any other manner such as, for example, by separate hardware and/or software components, by instructions executed by a general purpose computer, by a transistor circuit, etc.

The controller 104 of the illustrated example includes a zero crossing detector 106, a counter 108, a DRC controller 110, a DRC register 112, a digitally-controlled oscillator (DCO) 114, a COMCLK phase controller 115, a divider 116, a state machine 118, a state machine controller 119, a driver 120, a phase detector 124, a proportional/integral (PI) controller 126, and a mode initializer 135, a mode controller 136.

The zero crossing detector 106 of the illustrated example receives the BEMF signals from, for example, three phases of the motor 102 and compares the signals to generate an operating signal (BTACH) representative of motor operating speed, a zero crossing (ZC) signal representative of the time when a phase crosses the center tap, and a state signal (MSTATE (also known as SCNTL)) representative of the motor state. The example zero crossing detector 106 causes the BTACH signal to be a logical high when BEMF signals from two phases intersect in time (i.e., when the time-varying waveforms cross) and causes the BTACH signal to be a logical low when any of the phase BEMF signals intersect the center tap signal in time. Thus, the output of the zero crossing detector 106 is a square wave pulse train. The zero crossing detector 106, the BTACH signal, the ZC signal, and the MSTATE signal are described in further detail in conjunction with FIGS. 2 and 3.

The counter 108 of the illustrated example receives the BTACH signal from the zero crossing detector 106 and determines the period of the BTACH signal by, for example, counting the amount of time that passes between two consecutive rising edges (i.e., a transition from logical low to logical high). The counter 108 may be calibrated to count the time in seconds or may count using any other periodic interval. In the illustrated example, the counter 108 is tied to the output of DCO 114. Typically, the clock signal will have a much faster rate than the rate of the BTACH signal.

The DRC controller 110 (which may also be known as a DRC initializer) of the illustrated example receives the count from the counter 108, which represents the period of the BTACH signal, and determines the initial DRC value that is to be stored in the DRC register 112. The initial DRC value is calculated to cause a clock signal COMCLK that is output from the divider 116 to match the frequency of BTACH generated from the motor's 102 BEMF. At the same time, the phase of COMCLK is also forced to be the same phase as BTACH generated from the motor's BEMF by COMCLK phase controller 115. This provides a quick way to determine the initial DRC value to match the operation conditions of the motor 102, thereby, shortening the starting time of the controller 104. In particular, the DRC value determines the signal (QVCO) output by the DCO 114 that is transmitted to the divider 116. In the example implementation, the initial DRC value is calculated according to the following equation:

$$DRC = \frac{DRC0 \times N_{DIV}}{CNT}, \quad [1]$$

where DRC is the initial DRC value to be stored in the DRC register 112, DRC0 is a predetermined value of DRC, $N_{DIV}$ is the constant by which the divider 116 divides the signal input to the divider 116, and CNT is the total count by the counter during one period of BTACH.

To simplify the operation of the controller 104, DRC0, the predetermined DRC value in the DRC register 112 may be initialized with the value 2048 (e.g., DRC0) so that multiplication of the value can be accomplished by binary shifting. The example CNT is calculated by the following equation:

$$CNT = \frac{T_{BTACH}}{T_{QVCO}} = \frac{\left(\frac{1}{f_{BTACH}}\right)}{\left(\frac{1}{f_{QVCO}}\right)} = \frac{f_{QVCO}}{f_{BTACH}}, \quad [2]$$

where $T_{BTACH}$ is the period of BTACH, $T_{QVCO}$ is the period of QVCO, $f_{BTACH}$ is the frequency of the BTACH signal, and $f_{QVCO}$ is the frequency of the output of the DCO 114.

To calculate the division, the DSP implementing the controller 104 may use a shift and subtract binary algorithm. $f_{QVCO}$ is calculated according to the following equation:

$$f_{QVCO} = \frac{DRC0}{K \times f_{clock}}, \quad [3]$$

where K is a constant of the DCO 114, and $f_{clock}$ is the frequency of the clock for the DCO 114 that is used to generate QVCO.

Accordingly, using equation [2] and equation [3], $f_{BTACH}$ is calculated according to the following equation:

$$f_{BTACH} = \frac{\left(\frac{DRC0}{K \times f_{clock}}\right)}{CNT}. \quad [4]$$

On the other hand, the frequency of the COMCLK signal ($f_{COMCLK}$) output from the DIV 116 is calculated according to the following equation:

$$f_{COMCLK} = \frac{f_{QVCO}}{N_{DIV}} = \frac{\left(\frac{DRC}{K \times f_{clock}}\right)}{N_{DIV}}. \quad [5]$$

Equation 1 is derived by setting the BTACH frequency $f_{BTACH}$ equal to the COMCLK frequency $f_{COMCLK}$ and solving for DRC. Accordingly, the value of DRC is calculated using equation [1] by the DRC initializer 110 to cause the frequency of COMCLK to match the frequency of BTACH, which is associated with the BEMF signal of the motor 102.

The DRC register 112 receives an updated DRC value from the PI controller 126 during operation of the controller 104 and only receives an initial value for DRC from the DRC controller 110 during startup or re-locking of the controller 104. The value stored in the DRC register 112 is passed to the DCO 114 for controlling the frequency and the phase of the QVCO signal output by the DCO 114. The example DRC register 112 may be a 16 bit register that receives a 16 bit DRC value or may be a register of any size.

The DCO 114 of the illustrated receives the DRC value from the DRC register 112 and outputs a clock signal having a frequency based on the DRC value and the input clock signal. For example, as shown in equation [3], the DCO 114 generates QVCO having a frequency equal to DRC divided by the constant K and the frequency of the clock. The DCO 114 outputs the QVCO signal that is received by the divider 116.

The COMCLK phase controller 115 (which may also be known as the COMCLK phase initializer) controls the divider 116 to cause the COMCLK signal output by the divider 116 to have the same phase as BTACH generated from the motor's 102 BEMF.

The divider 116 divides the QVCO signal by a constant value to generate the COMCLK signal that matches the frequency of the BTACH signal. The divider 116 allows the DCO 114 to output at a much higher frequency than the actual frequency desired for the COMCLK signal. For example, the divider 116 may divide the QVCO frequency by 64. The COMCLK signal output by the divider 116 is transmitted to the state machine 118 and the phase detector 124.

The state machine 118 of the illustrated example outputs signals that cause the driver 120 to deliver energy to particular phases of the motor 102. The state machine 118 may have several states, with each state controlling the current flowing into or out of particular phases. For example, state 1 of the state machine will force current to flow into phase A and out of phase B of the motor 102. The COMCLK signal controls the rate at which the state machine 118 progresses through the various states. Accordingly, when the COMCLK signal matches the frequency of BTACH generated from the motor's 102 BEMF, the driving signals will drive the motor phases properly to generate maximum torque and to minimize mechanical vibrations. The state machine 118 receives a control signal from the mode controller 136 that causes the state machine 118 to be in coast mode, run mode, or in any other modes. In coast mode, the state machine 118 outputs a state in which the driver 120 does not drive the motor 102.

The state machine controller 119 of the illustrated example (which may also be known as the state machine initializer) receive the MSTATE signal and forces the state machine 118 to be in the same state as the state indicated by the MSTATE signal. For example, if the state machine 118 is in state 1, but the motor 102 is in state 2 as indicated by the MSTATE signal, the state machine controller 119 will force the state machine 118 to be in state 2.

The driver 120 of the illustrated example receives the signals output from the state machine 118 and controls the current flow to the motor 102 according to the signals. The driver 120 is described in further detail in conjunction with FIG. 2.

The phase detector 124 of the illustrated example receives the COMCLK signal and the ZC signal and determines the phase error between the two signals. The error signal from the phase detector 124 is used when the motor 102 is being driven by the driver 120 (e.g., the mode controller 136 is in run mode). Because the ZC signal includes substantial glitches while the motor is driven during run mode, the phase detector 124 of the illustrated example opens a detection window based on the COMCLK. The phase detector 124 outputs an error signal when the edges of the ZC signal do not fall in the center of the window on the average. Adjusting the frequency of the COMCLK signal will adjust the position of the window so that its center is aligned to the edges of the ZC signal.

The PI controller 126 of the illustrated example receives the error signal from the phase detector 124, and outputs a DRC value to cause the generation of COMCLK signal. The PI controller works to reduce the error between the frequency of the COMCLK signal and the ZC signal. While a PI controller 126 is implemented in the illustrated example, any control system may be used such as, for example, a PID controller, or any other closed-loop control system.

The example PI controller 126 includes a proportional block having a constant 130 and an integral block having a constant 132 and a register 134.

The proportional block receives the error signal from the phase detector 124, multiplies the error by a constant PKP 130, and outputs the result. The integral block forms the output by adding the error signal from the phase detector 124 multiplied by a constant PKI 132 and an output of the integral block from the previous cycle. The result of the integral block is latched in the register 134 and used for the next cycle. The result of the output of the integral block is added to the output of the proportional block and, then, output from the PI controller to the DRC register 112.

The mode initializer 135 of the illustrated example initializes the mode set by the mode controller 136 during startup. For example, the mode initializer 135 may cause the mode controller 136 to set the motor to a mode that drives the motor up to an initial speed and then set the motor to coast to allow the BTACH to be monitored for initialization of the controller 104. The mode initializer 135, like other components of the example system of FIG. 1, may not be used in all implementations. For example, the functionality of the mode initializer 135 may be included in the mode controller 136 and/or the DRC controller 110.

Returning to the mode controller 136, the mode controller 136 controls the operating modes of the motor (e.g., switches between various modes such as, coast mode, run mode, etc.).

The mode controller 136 may control the modes autonomously based on the operation of the controller 104 and/or may receive control signals that specifies the modes. For example, the controller 104 may include a serial port that allows an input to specify the modes. The input serial port may additionally allow control of other aspects of the controller 104 such as, for example, the constant values for the proportional block 130 and the integral block 132 and/or the timing as to when the DRC controller 110 is to initialize the DRC value.

Figure 2:
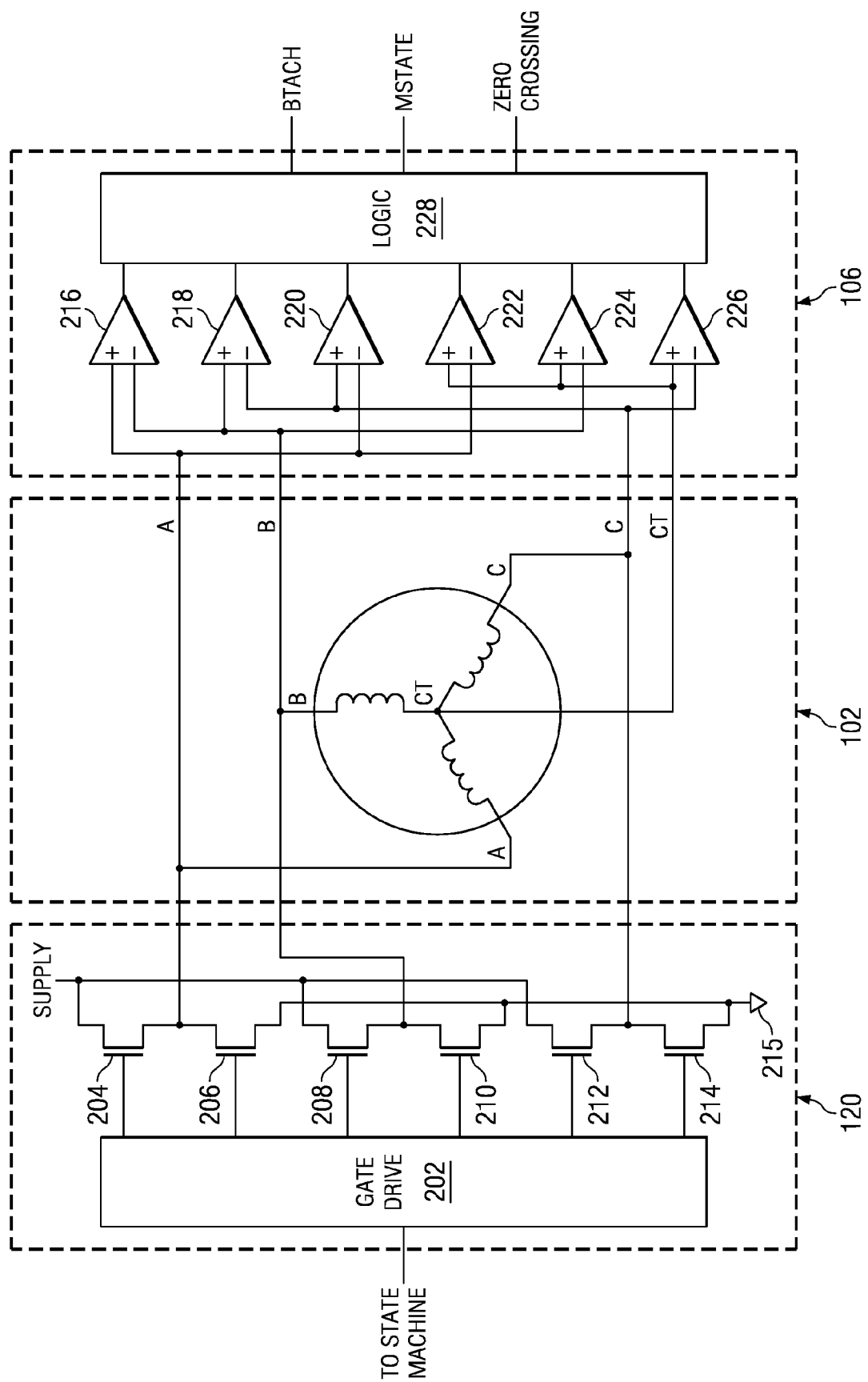
FIG. 2 is a block diagram providing further detail of the driver, the motor, and the zero crossing detector of FIG. 1.

FIG. 2 is a block diagram providing further detail of the driver 120, the motor 102, and the zero crossing detector 106 of FIG. 1.

The example implementation of the driver 120 includes a gate drive 202 and transistors 204-214.

The gate drive 202 of the illustrated example receives the signal from the state machine 118 and converts the signal to control signals based on the specified state. The control signals control the transistors 204-214. For example, when the state machine 118 is in state 1, current should flow from supply to phase A, then to phase B, and then to the ground. The gate drive 202 will generate proper signals to cause transistors 204 and 210 to be on, and transistors 206, 208, 212, and 214 to be off.

The transistors 204-214 of the illustrated example are metal oxide semiconductor field effect transistors (MOSFETs). Persons of ordinary in the art will recognize that any type of transistor or controllable switch may be used to control the application of the supply to the motor 102. In addition, while FIG. 2 illustrates a particular implementation of a driver, any other driver capable of driving the motor 102 may be used.

The motor 102 of the illustrated example is a three-phase motor. The motor 102 includes the phase A connection, the phase B connection, and the phase C connection. In addition, the motor 102 includes a center tap connection. In the case that a center connection is not provided, an artificial center tap may be generated in zero crossing detector 106

The zero crossing detector 106 of the illustrated example receives the signals from each of the phase connections and the center tap connection of the motor 102 and generates the BTACH signal, the ZC signal, and the MSTATE signal through logic 228. The zero crossing detector 106 includes comparators 216-226 and logic 228.

The comparators 216-226 compare their positive inputs and negative inputs, and output a logic high if the positive inputs are greater than the negative inputs or a logic low if the positive inputs are less than the negative inputs. For example, the comparator 216 compares the phase A signal to the phase B signal and outputs a logical high when the voltage of phase A is greater than the voltage of phase B and outputs a logical low when the voltage of phase A is less than the voltage of phase B. Other comparators 218-226 operate in the same way as comparator 216. The comparators may include hysteresis to avoid glitches in the BTACH signal when the input signals to comparators have noise and change slowly.

The logic 228 of the illustrated example receives the signals from the comparators 216-226 and generates the BTACH signal. The logic 228 of the illustrated example causes the BTACH signal to be logical high whenever a transient from low to high is received from any of the comparators 216, 218, and 220 (i.e., the phase-to-phase comparators). The logic 228 causes the BTACH signal to be a logical low whenever a transient from low to high is received from any one of the comparators 222, 224, or 226 (i.e., the phase-to-center tap comparators).

The logic 228 generates MSTATE by encoding the output of the six comparators. MSTATE represents the state of the motor, and the rotor position of the motor at the crossing points of each comparator.

The logic 228 also generates the ZC signal used in the run mode as one of the phase detector 124 inputs. The ZC signal indicates the time when a phase signal crosses the center tap signal.

Figure 3:
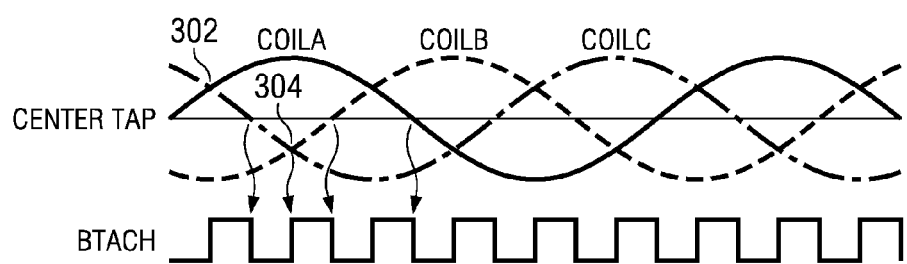
FIG. 3 is a chart illustrating the relationship between the signals received from the phase connections and the center tap of the motor and the BTACH signal.

FIG. 3 is a chart illustrating the relationship between the signals received from the phase connections and the center tap of the motor 102 and the BTACH signal. For example, at reference 302, the intersection of the signal from phase A (COILA) and the signal from phase C (COILC) causes comparator 220 to output a logical high which causes the BTACH signal to move to a logical high. At reference 304 the intersection of the signal from phase C (COILC) and the center tap signal causes the BTACH signal to move to a logical low.

Figure 4:
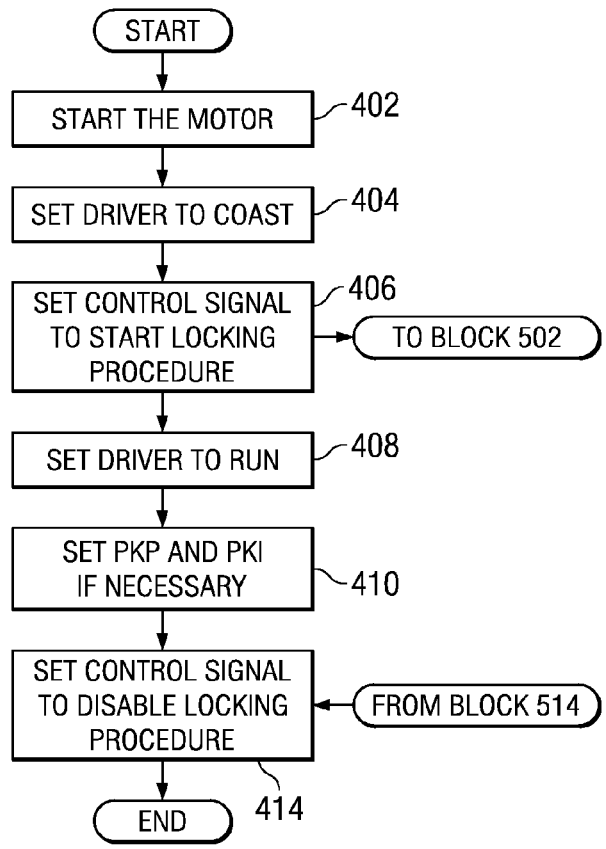
FIG. 4 is a flowchart representative of example machine readable instructions that may be executed to implement the controller of FIGS. 1 and/or 2.
Figure 5:
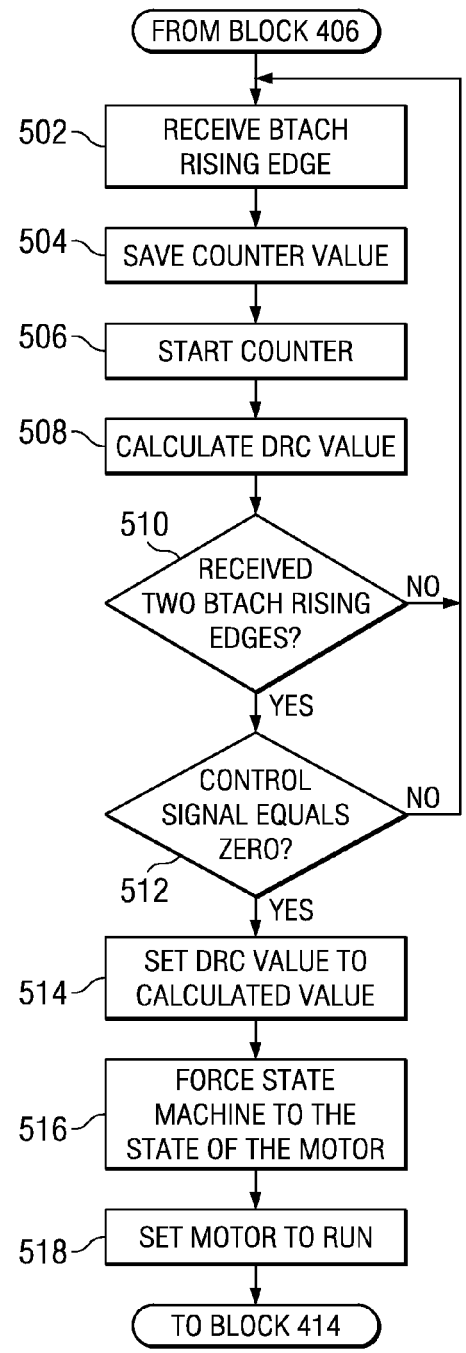
FIG. 5 is a flowchart representative of example machine readable instructions that may be executed to implement the initializing locking procedure initiated in FIG. 4.

FIGS. 4 and 5 illustrate flowcharts representative of example processes that may be executed to implement the example controller 104 illustrated in FIGS. 1 and 2. The example processes of FIGS. 4 and 5 may be implemented using machine readable instructions executed by a processor, a controller, and/or any other suitable processing device. For example, the example processes of FIGS. 4 and 5 may be embodied in coded instructions stored on a tangible medium such as a flash memory, or RAM associated with a processor (e.g., a DSP). Alternatively, some or all of the example processes shown in the flowcharts of FIGS. 4 and 5 may be implemented using an application specific integrated circuit (ASIC), a programmable logic device (PLD), a field programmable logic device (FPLD), discrete logic, hardware, firmware, etc. Also, some or all of the example processes of FIGS. 4 and 5 may be implemented manually or as combinations of any of the foregoing techniques, for example, a combination of firmware and/or software and hardware. Further, although the example processes of FIGS. 4 and 5 are described with reference to the flowcharts of FIGS. 4 and 5, persons of ordinary skill in the art will readily appreciate that many other methods of implementing the example controller 104 illustrated in FIGS. 4 and 5 may be employed. For example, the order of execution of the blocks may be changed, and/or some of the blocks described may be changed, eliminated, subdivided, or combined. Additionally, persons of ordinary skill in the art will appreciate that the example processes of FIGS. 4 and 5 be carried out sequentially and/or carried out in parallel by, for example, separate processing threads, processors, devices, circuits, etc.

The example process of FIG. 4 begins with, for example, the driving of the motor (e.g., the motor 102 of FIG. 1) to a minimum speed so that BEMF will be generated when the motor is not driven (i.e., coasting). For example, the motor may be driven to a speed between 300 revolutions per minute (RPM) and 1000 RPM (block 402). Then, the motor is put into coast mode (e.g., using the mode controller 136 to set the state machine 118 to cause the driver 120 to not drive the motor 102) (block 404). That is, during coast mode of operation, no power is provided to the motor 102. Then, the initializing locking procedure is started (block 406). One example of the initializing locking procedure is illustrated in FIG. 5. In the illustrated example, the illustrated initializing locking procedure will operate in parallel with blocks 408-414. Alternatively, the initializing locking procedure may complete operation before block 408.

After the initializing locking procedure is started, the driver is switched to run mode (e.g., the mode controller will set the state machine 118 to set the driver 120 to drive the motor 102) (block 408). Changing the mode while the initializing locking procedure is enabled will not immediately change the operating mode, but will set the mode that will be switched-to once the initializing locking procedure completes or is terminated.

Then, the controller 104 sets the PI controller parameters (e.g., the proportional block 130 and the integral block 132) and any other parameters associated with the run mode of operation (block 410). Then, the initializing locking procedure is set to stop (e.g., a control signal for the initializing locking procedure is set to zero) (block 414).

After the initializing locking procedure has completed, the frequency and phase of the driving signals from the controller 104 will match the frequency and phase of BEMF generated from the motor 102. Following the initializing locking procedure, the mode set in block 408, the run mode in the example, will engage and the driver (e.g., the driver 120) will drive the motor 102.

FIG. 5 is a flowchart representative of an example that may be executed to implement the initializing locking procedure initiated in block 406 of FIG. 4. The example machine readable instructions of FIG. 4 begin with the counter 108 of FIG. 1 receiving a rising edge of the BTACH signal from the zero crossing detector 106 (block 502). First, the counter 108 stores the current value of the counter 108 (block 504). Then, the counter 108 starts counting based on an incoming clock or an internal clock signal for the next BTACH period (block 506). Based on the counter 108 value, the DRC controller 110 calculates the value for initializing the DRC register (block 506). The DRC controller 110 then determines if two BTACH rising edges have been received (block 510). If two BTACH rising edges have not yet been received, control returns to block 502 to continue monitoring the BTACH signal.

If two BTACH rising edges have been received, the DRC controller 110 then determines if the control signal (e.g., the control signal set in block 414 of FIG. 4) has been set to zero to disable the locking procedure (block 512). If the control signal has not been set to zero, the startup locking procedure should continue and control returns to block 502 to continue monitoring the BTACH signal. If the control signal has been set to zero, the DRC controller 110 stores the value for initializing the DRC register in the DRC register 112. The value for initializing the DRC register and the feedback control of the controller 104 forces the COMCLK signal to have the same phase and frequency as the BTACH signal (block 510). The state machine 118 is then forced to the same state as the motor 102 (block 512). Finally, the motor 102 is immediately switched to run mode (e.g., the mode controller 136 causes the state machine 118 to cause the driver 120 to drive the motor 102).

Figure 6:
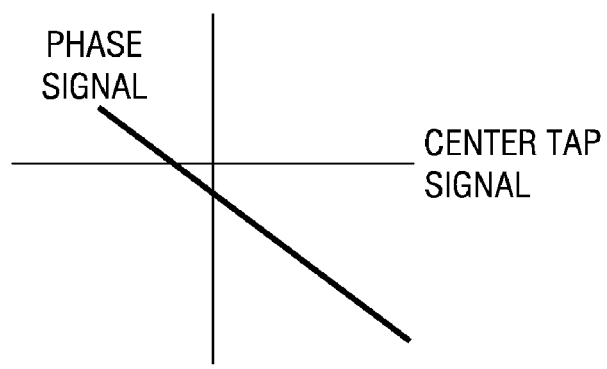
FIG. 6 is a graph illustrating an example plot of a phase signal and a center tap signal from the motor of FIG. 1.

FIG. 6 is a graph illustrating an example plot of a phase signal and a center tap signal from the motor of FIG. 1. The example BEMF from the motor 102 is a generally sinusoidal waveform. However, the BEMF is nearly linear at the zero crossing, as shown in the illustrated example. The phase signal can also cross the center tap in a opposite way. The phase signal may be any phase signal (e.g., a phase signal from the motor 102 of FIG. 1).

Figure 7:
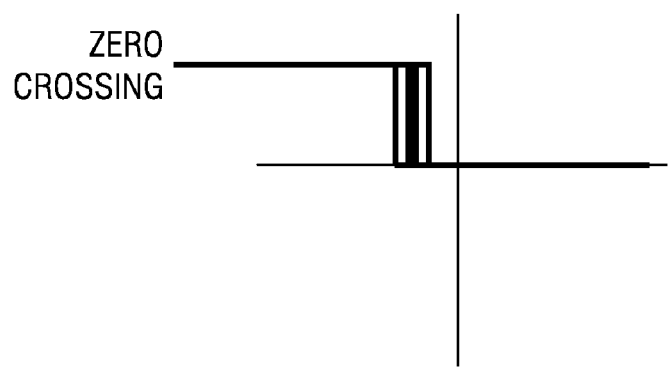
FIG. 7 is a graph illustrating an example plot of a zero crossing signal from the zero crossing detector of FIG. 1.

FIG. 7 is a graph illustrating an example plot of a zero crossing signal from the zero crossing detector of FIG. 1. As shown in the illustrated example, there are substantial glitches at the time that the zero crossing signal transitions from a logic high to a logic low (and vice versa). The transition corresponds to the phase signal crossing the center tap signal.

Figure 8:
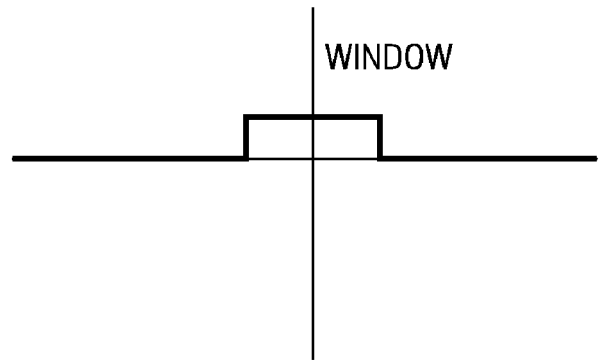
FIG. 8 is a graph illustrating an example plot of a phase detection window of the phase detector of FIG. 1.

FIG. 8 is a graph illustrating an example plot of a phase detection window of the phase detector of FIG. 1. The phase detector 124 of FIG. 1 sets up a detection window as illustrated in FIG. 1. The phase window allows the phase detector to determine the phase error between the zero crossing signal and the COMCLK signal. When the transition of the zero crossing signal is not centered in the window, the phase detector will generate an error to adjust the COMCLK signal to cause the window to be aligned with the center of the zero crossing transition through the phase lock loop chain.

From the foregoing, persons of ordinary skill in the art will appreciate that the above disclosed methods and apparatus may be realized within a single device or using two or more cooperating devices, and could be implemented by software, hardware, and/or firmware to implement a spindle motor controller disclosed herein.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A controller for controlling a motor within a hard disk drive, the controller comprising:
    a detector for comparing signals associated with an aspect of the motor and transmitting an operating signal;
    a digitally controlled oscillator for generating an oscillation signal;
    a counter coupled to receive the oscillation signal and the operating signal, the counter operative for transmitting a count signal associate with a time between consecutive zero crossings;
    an initializer coupled to receive the count signal and transmit an initialized signal associated with operating conditions of the motor; and
    an output device for receiving the initialized signal and transmitting output signals that deliver energy to the motor.

2. The controller of claim 1, wherein the motor is in a coast mode.

3. The controller of claim 1, wherein the aspects comprise phases of the motor.

4. The controller of claim 1, wherein the digitally controlled oscillator is locked to a back electromotive force.

5. The controller of claim 1, wherein the output device further comprises a state machine for delivering energy to particular phases of the motor.

6. The controller of claim 1, wherein the initializer further comprises a register for storing the initialized signal.

7. A method for initializing a motor controller, the method comprising the steps of:
    setting a driver associated with the motor to a coast mode;
    starting a locking procedure, wherein the locking procedure further comprises the steps of:
    receiving an operating signal;
    saving a counter value;
    starting the counter;
    calculating a first DRC value;
    determining whether two rising edges of the operating signal were received;
    determining if a control signal is zero after determining whether the two rising edges of the operating signal were received;
    setting a second DRC value to the first DRC value; and
    forcing a state machine to state of the motor.

8. The method of claim 7, wherein the locking procedure further comprises setting the motor to run.

9. The method of claim 7, further comprising starting the motor before setting the driver associated with the motor to coast.

10. The method of claim 9, wherein starting the motor comprises driving the motor to a minimum speed so that a back electromotive force will be generated when the motor is coasting.

11. The method of claim 7, wherein setting a driver associated with the motor to a coast mode comprises at least one of not driving the motor or not providing power to the motor.

12. The method of claim 7, further comprising continue monitoring the operating signal until determining that two rising edges of the operating signal were received.

13. A system comprising:
    a motor;
    a controller, the controller comprising:
        a detector for comparing signals associated with an aspect of the motor and transmitting an operating signal;
        a digitally controlled oscillator for generating an oscillation signal;
        a counter coupled to receive the oscillation signal and the operating signal, the counter operative for transmitting a count signal associate with a time between consecutive zero crossings;
        an initializer coupled to receive the count signal and transmit an initialized signal associated with operating conditions of the motor; and
        an output device for receiving the initialized signal and transmitting output signals that deliver energy to the motor.

14. The system of claim 13, wherein the motor comprises a spindle motor that drives rotation of data storage platters in a hard disk drive.

* * * * *